United States Patent
Takagi et al.

(10) Patent No.: US 8,031,811 B2
(45) Date of Patent: Oct. 4, 2011

(54) DYNAMIC DC OFFSET CANCELING APPARATUS AND DYNAMIC DC OFFSET CANCELING METHOD

(75) Inventors: Nobuhiro Takagi, Kanagawa (JP); Yukiteru Murao, Kanagawa (JP); Tomohiro Yui, Kanagawa (JP); Yasutaka Uramoto, Kanagawa (JP); Atsushi Taguchi, Kanagawa (JP); Koji Suzuki, Kanagawa (JP); Yoshinao Kawai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 705 days.

(21) Appl. No.: 12/127,353

(22) Filed: May 27, 2008

(65) Prior Publication Data
US 2008/0298506 A1    Dec. 4, 2008

(30) Foreign Application Priority Data

May 29, 2007  (JP) ................. 2007-142110

(51) Int. Cl.
*H04L 25/06* (2006.01)
(52) U.S. Cl. ........ 375/319; 375/316; 375/346; 375/348; 375/349; 375/148; 375/147
(58) Field of Classification Search .............. 375/319, 375/316, 346, 348, 349, 148, 147
See application file for complete search history.

(56) References Cited

U.S. PATENT DOCUMENTS

| | | | |
|---|---|---|---|
| 6,370,205 B1 | 4/2002 | Londoff et al. | |
| 6,901,121 B1 | 5/2005 | Dubrovin et al. | |
| 7,035,589 B1 * | 4/2006 | Meng et al. | 455/63.1 |
| 2003/0133518 A1 * | 7/2003 | Koomullil et al. | 375/326 |
| 2007/0081616 A1 * | 4/2007 | Yui et al. | 375/346 |
| 2007/0281655 A1 * | 12/2007 | Ishikawa et al. | 455/296 |
| 2007/0297536 A1 | 12/2007 | Yui et al. | |

FOREIGN PATENT DOCUMENTS
JP    2000-278335    10/2000

* cited by examiner

*Primary Examiner* — Chieh M Fan
*Assistant Examiner* — Siu Lee
(74) *Attorney, Agent, or Firm* — Greenblum & Bernstein, P.L.C.

(57) ABSTRACT

The dynamic DC offset canceling apparatus includes: section 104 that detects dynamic DC offset in longest overlapping part sequences from the differences between the sampling values of a first longest overlapping part sequence and the sampling values of a second longest overlapping part sequence, the first longest overlapping part sequence and the second longest overlapping part sequence being overlapping part sequences in a training sequence of the received signal; section 105 that detects dynamic DC offset outside the longest overlapping part sequences from the difference between an average value of sampling values of a received signal which exists in a burst before the first longest overlapping part sequence, and an average value of sampling values of a received signal which exists in a burst after the second longest overlapping part sequence; and section 106 that adaptively subtracts a DC offset value from the received signal based on these results.

11 Claims, 10 Drawing Sheets

DYNAMIC DC OFFSET CANCELING APPARATUS AND DYNAMIC DC OFFSET CANCELING METHOD

CROSS REFERENCE TO RELATED APPLICATIONS

The disclosure of Japanese Patent Application No. 2007-142110, filed on May 29, 2007, including the specification, drawings and abstract, is incorporated herein by reference in its entirety.

BACKGROUND OF THE INVENTION

1. Field of the Invention

The present invention relates to a dynamic DC offset canceling apparatus and a dynamic DC offset canceling method for a receiver in wireless communication, and primarily relates to a dynamic DC offset canceling apparatus and a dynamic DC offset canceling method used in the receiver having a radio section adopting the direct conversion scheme in digital mobile communication.

2. Description of Related Art

The receiver in digital mobile communication receives radio waves from a plurality of paths with different propagation times, due to the influence of multipath fading which may occur in a radio link. Therefore, delay distortion is produced in the received signal and bit error rate characteristics deteriorate. Faster symbol rates produce larger delay distortion, and so with future high-speed digital mobile communication equipment, the influence of delay distortion cannot be ignored, and cancellation of delay distortion becomes essential.

An equalizer is a typical means for correcting delay distortion. In radio communication, conventionally, equalizers are mounted on receivers that perform high-speed transmission, and, further, in recent years, equalizers are mounted on mobile telephones and the like adopting GSM (Global System for Mobile Communications), which is the European digital mobile telephone standard. Further, there is an increase in the number of receivers that improve equalization accuracy and improve bit error rate characteristics by estimating the DC offset component, which may be mainly produced in a radio RF section, using an average value of the received signal and canceling the DC offset component as preprocessing of the equalizer.

FIG. 11 is a block diagram showing the configuration of a receiver with a conventional DC offset canceling apparatus, and FIG. 12 shows the configuration of a DC offset compensating processing section in the receiver. In FIG. 11 and FIG. 12, receiver 10 with the DC offset canceling apparatus is configured with DC offset compensating processing section 11, equalizing processing section 12 and decoding processing section 13, and DC offset compensating processing section 11 is configured with average value calculating section 14 and DC offset canceling section 15. In DC offset compensating processing section 11, average value calculating section 14 estimates a DC offset component using an average value of the received signals, and DC offset canceling section 15 cancels the DC offset component.

In recent years, to reduce the circuit scale (cost) of the radio RF section, the direct conversion reception scheme is adopted instead of the heterodyne reception scheme which converts a received frequency to an intermediate frequency. However, to accompany the spread of the direct conversion reception scheme, in the narrow band digital modulation scheme used in GSM and the like, the received signal frequency is equal to a local frequency, and so the DC offset component remains in a detection output of the receiver (baseband received signal), and, in particular in GSM, DC offset (hereinafter "dynamic DC offset") increases rapidly in the middle of the burst, and, as a result, DC offset may become difficult to cancel by estimating an average value of the received signals, which may result in deterioration of bit error rate characteristics. Further, in GSM, known codes (training sequence) for acquiring synchronization and assisting reception are embedded in the middle of the burst, and dynamic DC offset in the middle of the burst deteriorates bit error rate characteristics significantly.

To cancel dynamic DC offset, with the conventional DC offset canceling algorithm, digital baseband signals are mapped on an IQ diagram, and the I and Q coordinates of the center point are determined by two-dimensional fitting of a geometric figure using a subset of signal values. It is possible to learn changes with dynamic DC offset from changes of the center point (see, for example, Patent Document 1: Japanese Patent Application Laid-Open No. 2000-278335).

However, a problem with such a conventional DC offset canceling apparatus is that calculation for determining the center point for an arbitrary consecutive subset of digital baseband signals increases the amount of processing.

SUMMARY OF THE INVENTION

It is therefore an object of the present invention to provide a dynamic DC offset canceling apparatus and a dynamic DC offset canceling method that make it possible to detect and cancel dynamic DC offset which may be produced in the middle of a burst and that require a relatively small amount of processing.

According to an aspect of the invention, the dynamic direct current offset canceling apparatus includes: a section for detecting dynamic direct current offset in longest overlapping part sequences, that detects dynamic direct current offset in the longest overlapping part sequences from differences between sampling values of a first longest overlapping part sequence and sampling values of a second longest overlapping part sequence, the first longest overlapping part sequence and the second longest overlapping part sequence being overlapping part sequences in a training sequence of the received signal converted to a digital baseband signal; a section for detecting dynamic direct current offset outside longest overlapping part sequences, that detects dynamic direct current offset outside the longest overlapping part sequences from a difference between an average value of sampling values of the received signal which exists in a burst before the first longest overlapping part sequence, and an average value of sampling values of the received signal which exists in a burst after the second longest overlapping part sequence; and a direct current offset canceling section that adaptively subtracts a direct current offset value from the received signal based on the detection result outputted from the section for detecting dynamic direct current offset in the longest overlapping part sequences and the detection result outputted from the section for detecting dynamic direct current offset outside the longest overlapping part sequences.

According to another aspect of the invention, the dynamic direct current offset canceling method includes the steps of: detecting dynamic direct current offset in longest overlapping part sequences from differences between sampling values of a first longest overlapping part sequence and sampling values of a second longest overlapping part sequence, the first longest overlapping part sequence and the second longest overlapping part sequence being overlapping part sequences in a training sequence of a received signal converted to a digital baseband signal; detecting dynamic direct current offset outside the longest overlapping part sequences from a difference between an average value of sampling values of a received signal which exists in a burst before the first longest overlapping part sequence, and an average value of sampling values of a received signal which exists in a burst after the second longest overlapping part sequence; and adaptively subtracting a direct current offset value from the received signal based on the detection result of the dynamic direct current offset in the longest overlapping part sequences and the detection result of the dynamic direct current offset outside the longest overlapping part sequences.

DETAILED DESCRIPTION OF THE PREFERRED EMBODIMENT

Embodiments of the present invention will be described in detail below with reference to the accompanying drawings.

Embodiment 1

Figure 1:
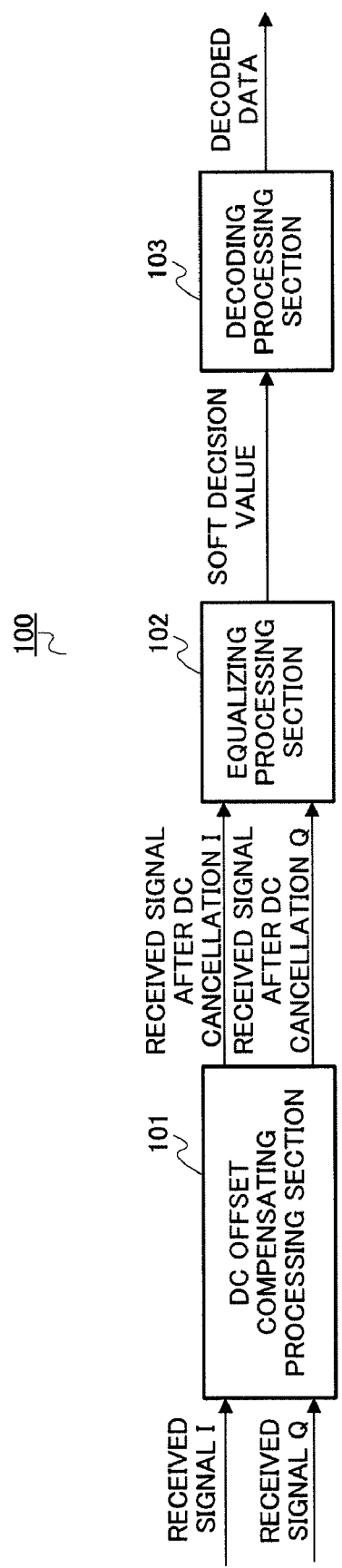
FIG. 1 is a block diagram showing the configuration of a receiver with a dynamic DC offset canceling apparatus according to Embodiment 1 of the present invention.

FIG. 1 is a block diagram showing the configuration of a receiver with the dynamic DC offset canceling apparatus according to Embodiment 1 of the present invention. The present embodiment is an example where the present invention is applied to a digital mobile communication receiver adopting the GSM scheme.

In FIG. 1, receiver 100 with a dynamic DC offset canceling apparatus is configured with: DC offset compensating processing section 101 that receives as input received signals I and Q which are converted to digital baseband signals and cancels the DC offset from the received signals I and Q; equalizing processing section 102 that equalizes the received signals subjected to DC offset compensating processing; and decoding processing section 103 that decodes the received signals equalized by equalizing processing section 102.

Figure 2:
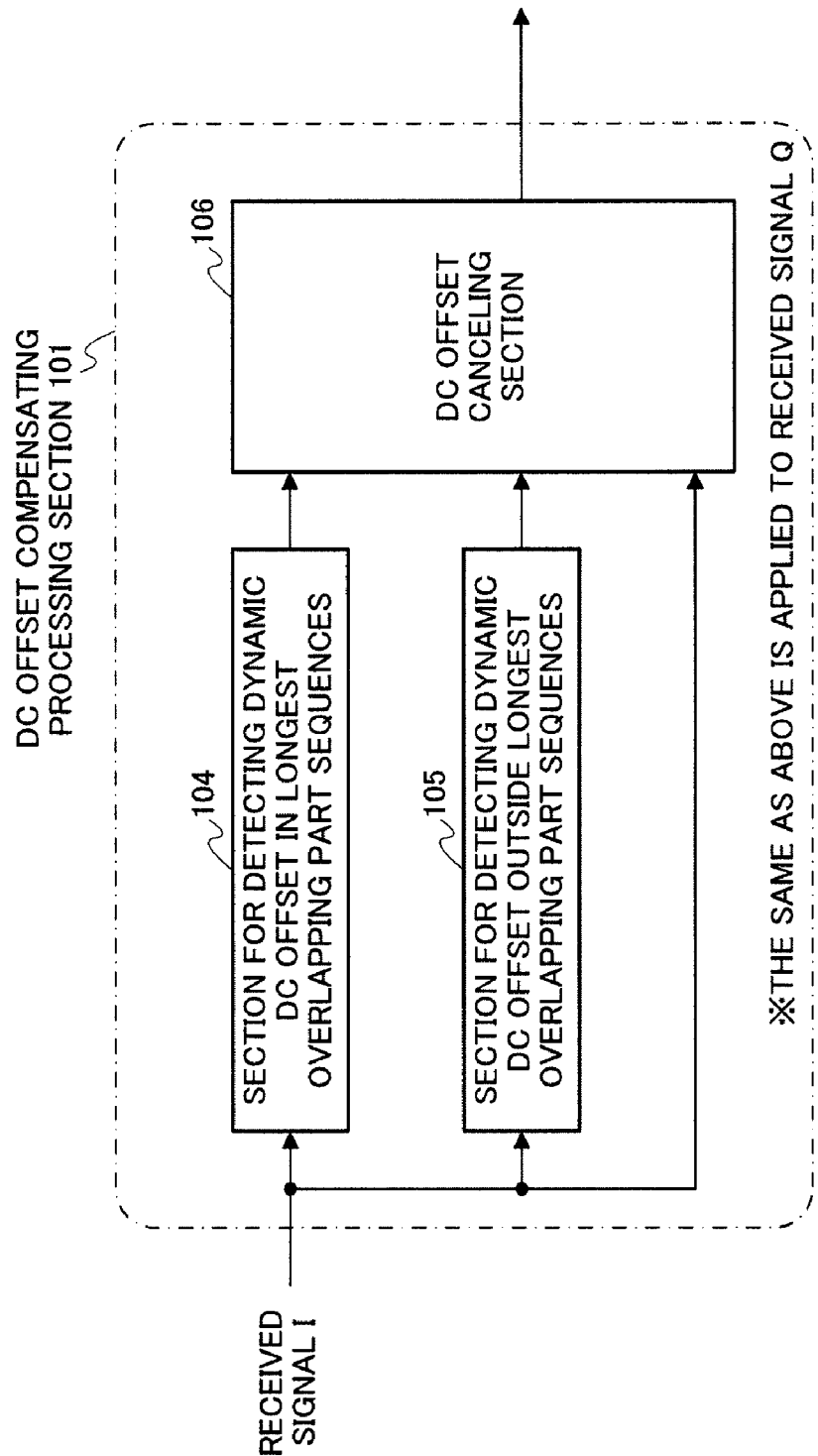
FIG. 2 shows the configuration of a DC offset compensating processing section in the dynamic DC offset canceling apparatus according to Embodiment 1.

FIG. 2 shows the configuration of above-described DC offset compensating processing section 101. The same processing is performed for the I-phase and Q-phase components independently, and therefore the processing for the I-phase component will be described as a typical example.

In FIG. 2, DC offset compensating processing section 101 is configured with: section 104 for detecting dynamic DC offset in the longest overlapping part sequences in an I-phase signal (hereinafter "section 104"); section 105 for detecting dynamic DC offset outside the longest overlapping part sequences in the I-phase signal (hereinafter "section 105"); and DC offset canceling section 106. The configuration for the received signal Q is the same as that in FIG. 2. Section 104 extracts, from the received signal, the first longest overlapping part sequence and the second longest overlapping part sequence at predetermined positions, and detects dynamic DC offset in the longest overlapping part sequences from the differences between the sampling values of the first longest overlapping part sequence and the sampling values of the second longest overlapping part sequence.

Section 105 detects, from the received signal, dynamic DC offset outside the longest overlapping part sequences from the difference between an average value of the sampling values of the received signal or part of the received signal which exists in a burst before the first longest overlapping part sequence, and an average value of the sampling values of a received signal or part of the received signal which exists in a burst after the second longest overlapping part sequence.

DC offset canceling section 106 performs DC offset cancellation of adaptively subtracting a DC offset value from the received signal based on the detection result outputted from section 104 and the detection result outputted from section 105.

Figure 3:
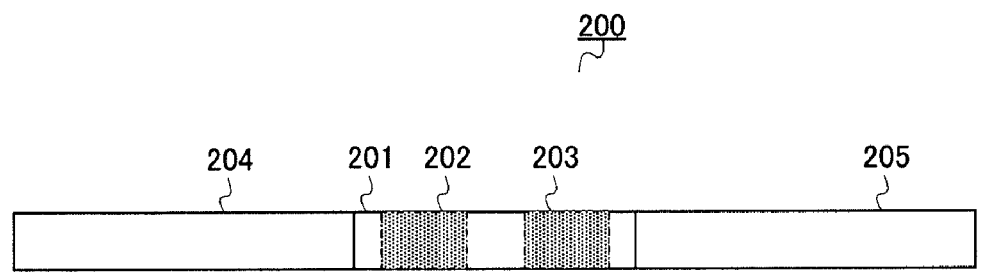
FIG. 3 shows a configuration example of a burst of the dynamic DC offset canceling apparatus according to Embodiment 1.
Figure 4:
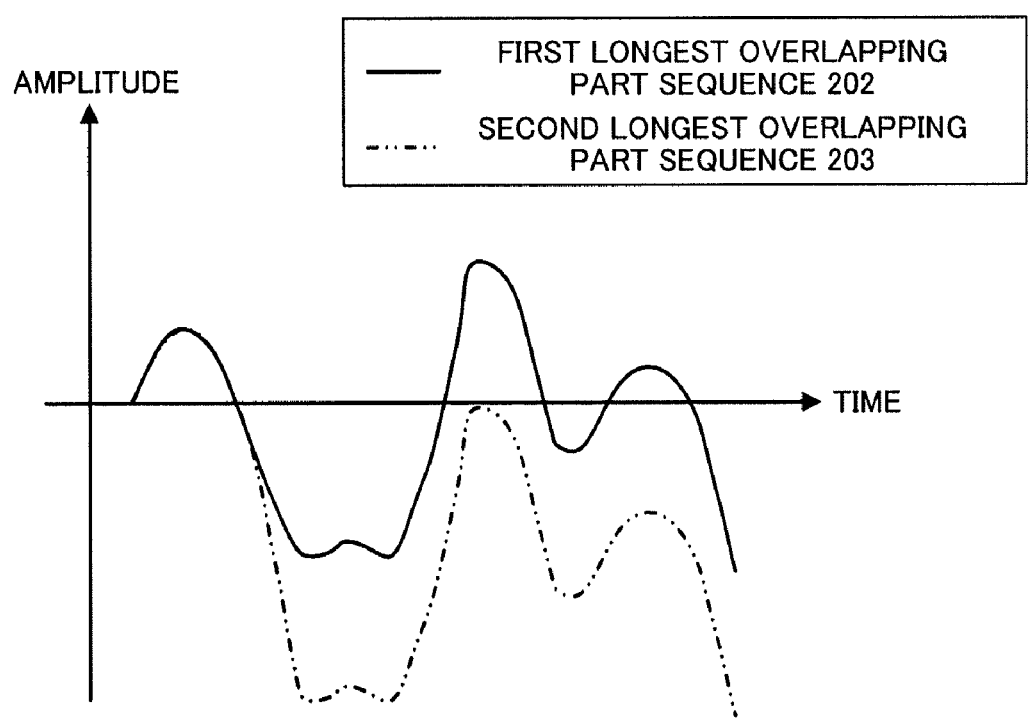
FIG. 4 shows an example of a waveform upon dynamic DC offset detection in the dynamic DC offset canceling apparatus according to Embodiment 1.

FIG. 3 shows a configuration example of the burst, and FIG. 4 shows an example of a waveform upon dynamic DC offset detection.

In FIG. 3, in the middle of GSM burst 200, training sequence 201, which is a known code for acquiring synchronization and assisting reception, is embedded. Training sequence 201 has first longest overlapping part sequence 202 and second longest overlapping part sequence 203. Further, there is burst received signal 204 before the first longest overlapping part sequence of training sequence 201, and there is burst received signal 205 after the second longest overlapping part sequence of training sequence 201.

Although first longest overlapping part sequence 202 and second longest overlapping part sequence 203 are the same sequence and show the same waveform if the influences of fading and noise are removed, when dynamic DC offset is produced, the waveform fluctuation shown in FIG. 4 can be seen. The present embodiment detects dynamic DC offset using this characteristic.

Figure 5:
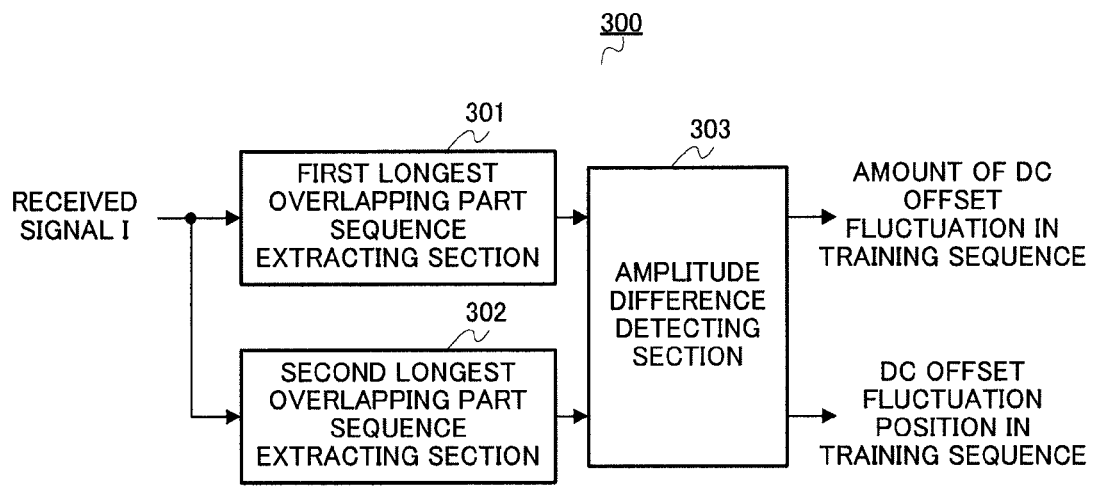
FIG. 5 is a block diagram showing the configuration of a high resolution version of a section for detecting dynamic DC offset in the longest overlapping part sequences in the dynamic DC offset canceling apparatus according to Embodiment 1.
Figure 6:
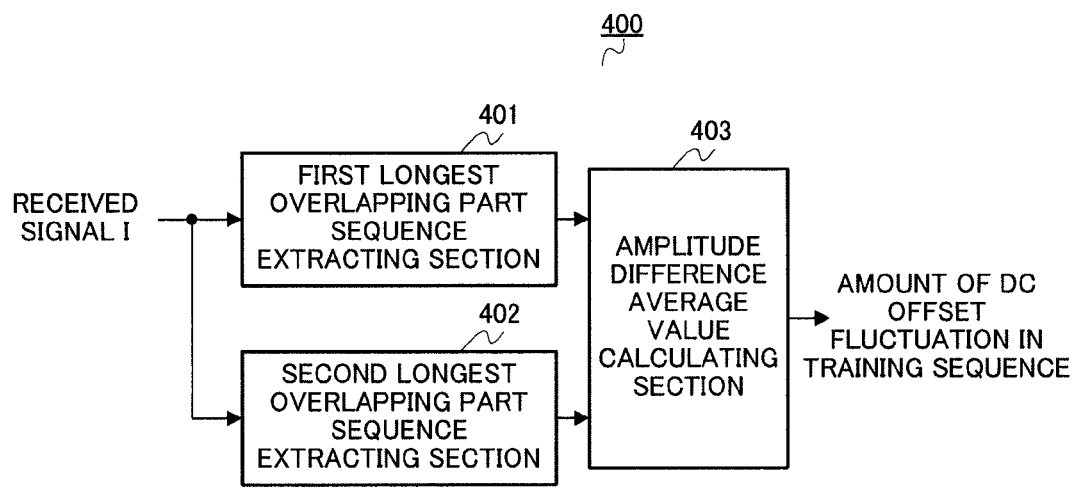
FIG. 6 is a block diagram showing the configuration of a low resolution version of the section for detecting dynamic DC offset in the longest overlapping part sequences in the dynamic DC offset canceling apparatus according to Embodiment 1.

Above-described section 104 can be realized using the methods shown in FIG. 5 and FIG. 6.

FIG. 5 is a block diagram showing the configuration of a high resolution version of above-described section 104, and FIG. 6 is a block diagram showing the configuration of a low resolution version of above-described section 104.

In FIG. 5, section 300 for detecting dynamic DC offset in the longest overlapping part sequences (hereinafter "section 300") is a high resolution version of section 104.

Section 300 is configured with first longest overlapping part sequence extracting section 301, second longest overlapping part sequence extracting section 302 and amplitude difference detecting section 303.

First longest overlapping part sequence extracting section 301 receives a signal converted to a digital baseband signal as input, and extracts and outputs the first longest overlapping part sequence at a predetermined position.

Second longest overlapping part sequence extracting section 302 receives a signal converted to a digital baseband signal as input, and extracts and outputs the second longest overlapping part sequence at a predetermined position.

Amplitude difference detecting section 303 calculates the differences between the sampling values of the first longest overlapping part received signal outputted from first longest overlapping part sequence extracting section 301 and the sampling values of the second longest overlapping part received signal outputted from second longest overlapping part sequence extracting section 302, and, using a position where the difference exceeds a predetermined threshold as a DC offset fluctuation position, calculates an average value of the differences between the sampling values before the DC offset fluctuation position and an average value of the differences between the sampling values after the DC offset fluctuation position, and outputs the difference between the average values as the amount of DC offset fluctuation.

By providing a threshold, it is possible to prevent differences due to the influences of noise and fading from being mistaken for DC offset fluctuation. The average value of the differences between the sampling values before the DC offset fluctuation position and the average value of the differences between the sampling values after the DC offset fluctuation position may be average values in arbitrary regions. For example, it is also possible to use an average value in a region in a training sequence, which is a known signal, and use the whole of the burst. It is also possible to limit the number of times of averaging to powers of two.

In FIG. 6, section 400 for detecting dynamic DC offset in the longest overlapping part sequences (hereinafter "section 400") is a low resolution version of section 104.

Section 400 is configured with first longest overlapping part sequence extracting section 401, second longest overlapping part sequence extracting section 402 and amplitude difference average value calculating section 403.

First longest overlapping part sequence extracting section 401 receives a signal converted to a digital baseband signal as input, and extracts and outputs the first longest overlapping part sequence at a predetermined position.

Second longest overlapping part sequence extracting section 402 receives a signal converted to a digital baseband signal as input, and extracts and outputs the second longest overlapping part sequence at a predetermined position.

Amplitude difference average value calculating section 403 calculates an integral of the differences between the sampling values of the first longest overlapping part received signal outputted from first longest overlapping part sequence extracting section 401 and the sampling values of the second longest overlapping part received signal outputted from second longest overlapping part sequence extracting section 402, and, when the difference exceeds a predetermined threshold, outputs the integral of the differences as the amount of DC offset fluctuation.

Figure 7:
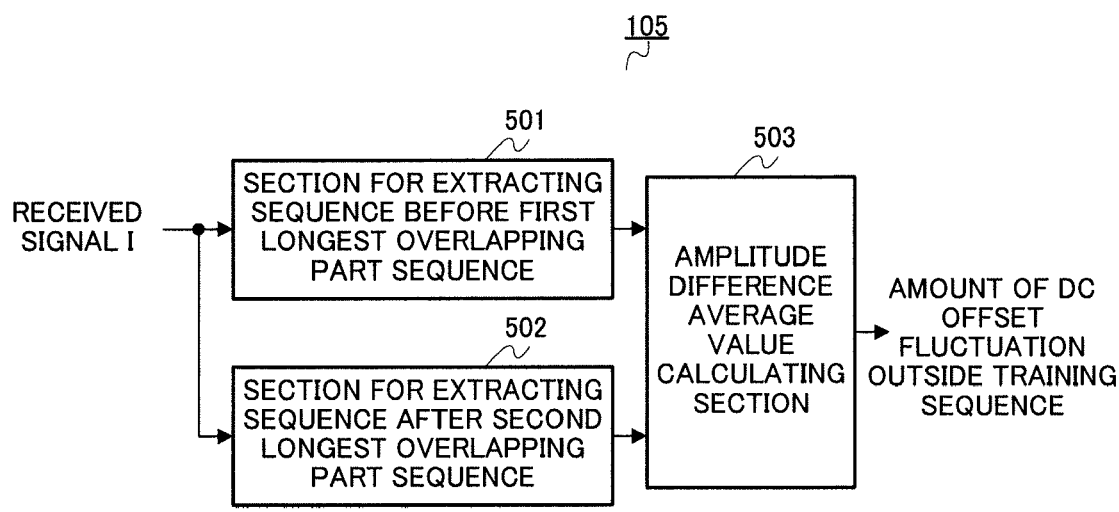
FIG. 7 is a block diagram showing the configuration of a section for detecting dynamic DC offset outside the longest overlapping part sequences in the dynamic DC offset canceling apparatus according to Embodiment 1.

FIG. 7 is a block diagram showing the configuration of above-described section 105.

In FIG. 7, above-described section 105 has section 501 for extracting a sequence before the first longest overlapping part sequence (hereinafter "section 501"), section 502 for extracting a sequence after the second longest overlapping part sequence (hereinafter "section 502") and amplitude difference average value calculating section 503.

Section 501 receives a signal converted to a digital baseband signal as input, and extracts, from the received signal, the sampling values of a received signal or part of the received signal which exists in a burst before the first longest overlapping part sequence at a predetermined position.

Section 502 receives a signal converted to a digital baseband signal as input, and extracts, from the received signal, the sampling values of a received signal or part of the received signal which exists in a burst after the second longest overlapping part sequence at a predetermined position.

Amplitude difference average value calculating section 503 calculates an integral of the sampling values before the first longest overlapping part received signal outputted from section 501 and an integral of the sampling values after the second longest overlapping part received signal outputted from section 502, and, when the difference between the integrals exceeds a predetermined threshold, outputs the difference between the integrals as the amount of DC offset fluctuation.

Figure 8:
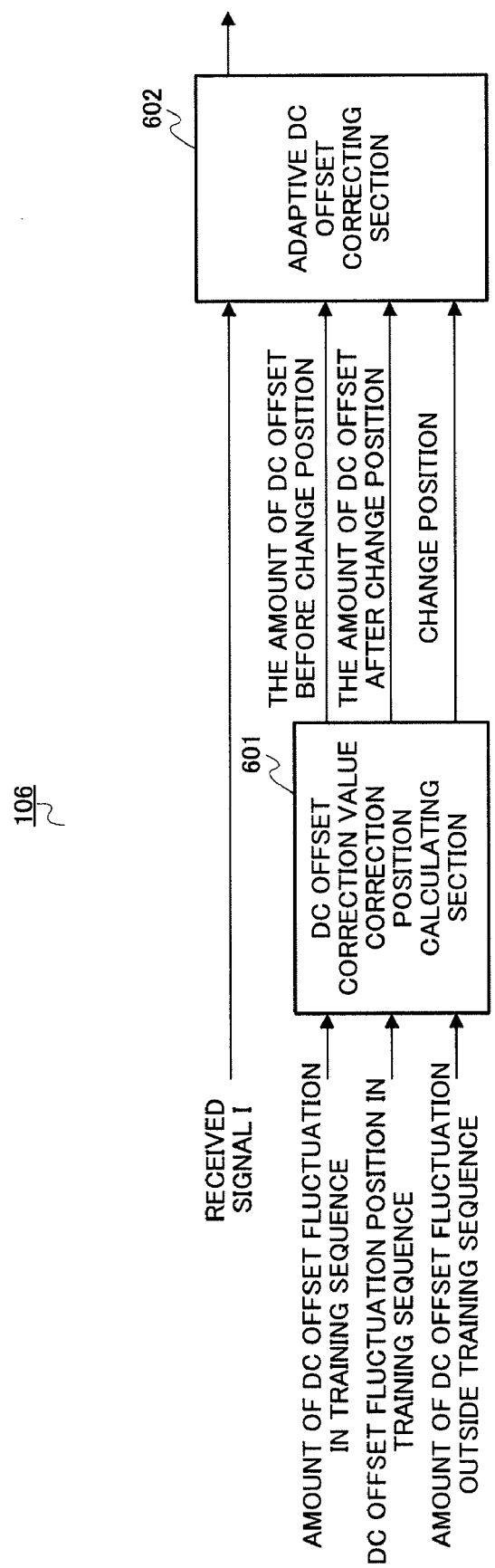
FIG. 8 is a block diagram showing the configuration of a DC offset canceling section in the dynamic DC offset canceling apparatus according to Embodiment 1.

FIG. 8 is a block diagram showing the configuration of above-described DC offset canceling section 106.

In FIG. 8, DC offset canceling section 106 is configured with DC offset correction value and correction position calculating section 601 and adaptive DC offset correcting section 602.

DC offset correction value and correction position calculating section 601 receives as input, a signal converted to a digital baseband signal, the amount of DC offset fluctuation and the DC offset fluctuation position in a training sequence outputted from section 104, and the amount of DC offset fluctuation outside the training sequence outputted from section 105. When the amount of DC offset fluctuation in the training sequence is detected, DC offset correction value and correction position calculating section 601 outputs the amount of DC offset fluctuation in the training sequence and the DC offset fluctuation position in the training sequence as the amount of DC offset after a change position and the change position, respectively. When the amount of the DC offset fluctuation in the training sequence is not detected, DC offset correction value and correction position calculating section 601 outputs the value obtained by inverting the sign of half of the amount of DC offset fluctuation outside the training sequence as the amount of DC offset before the change position, and the half of the amount of the DC offset fluctuation outside the training sequence as the amount of DC offset after the change position.

When the change position is set, adaptive DC offset correcting section 602 switches the amount of DC offset from the amount of DC offset before the change position to the amount of DC offset after the change position and subtracts the amount of DC offset from the received signal. When the change position is not set, adaptive DC offset correcting section 602 subtracts the amount of DC offset before the change position from the sampling values before the first longest overlapping part sequence, and subtracts the amount of DC offset after the change position from the sampling values after the second longest overlapping part sequence.

To simplify the processing, section 400 shown in FIG. 6 does not output the DC offset fluctuation position and uses the intermediate position between the first longest overlapping part sequence and the second longest overlapping part sequence as the change position, so that it is possible to reduce the amount of processing without substantially deteriorating reception performance.

The dynamic DC offset canceling operation of receiver 100 with the dynamic DC offset canceling apparatus configured as described above will be described.

[The Operation of DC Offset Compensating Processing Section 101]

With the present invention, a signal converted to a digital baseband signal is received as input, the sampling period for the received signal is Ts[s], the burst period is Tb[s], the training sequence (signal sequence for acquiring reception synchronization reported from the base station in advance) period is Tt[s], and the training sequence is embedded from time Tst[s] in each burst period. Further, to focus on a given partial sequence in the training sequence, there are the same sequences as the partial sequence in addition to the partial sequence, and their modulated signals are the same, and, amongst these partial sequences, the longest ones are made the longest overlapping part sequences, and the partial sequence appearing temporally earlier is made first longest overlapping part sequence 202 (see FIG. 3), and the partial sequence appearing temporally later is made second longest overlapping part sequence 203 (see FIG. 3). The received signal is subjected to quadrature modulation to obtain the I-phase and Q-phase components. The same processing is performed independently for the I-phase and Q-phase components, and therefore only the processing for the I-phase component will be described below.

First, as shown in FIG. 1 and FIG. 2, DC offset compensating processing section 101 receives a signal converted to a digital baseband signal as input.

Section 104 extracts, from the received signal, first longest overlapping part sequence 202 (see FIG. 3) and second longest overlapping part sequence 203 (see FIG. 3) at predetermined positions, and detects dynamic DC offset in the longest overlapping part sequences from the differences between the sampling values.

Further, section 105 detects, from the received signal, dynamic DC offset outside the longest overlapping part sequences from the difference between an average value of the sampling values of the received signal or part of the received signal which exists in a burst before first longest overlapping part sequence 202 (see FIG. 3), and an average value of the sampling values of the received signal or part of the received signal which exists in a burst after second longest overlapping part sequence 203 (see FIG. 3).

DC offset canceling section 106 performs DC offset cancellation of adaptively subtracting a DC offset value from the received signal based on the detection result outputted from section 104 and the detection result outputted from section 105.

By this means, it is possible to detect DC offset fluctuation which influences reception characteristics significantly, in the training sequence, with high accuracy using a known signal sequence, and also detect and cancel DC offset fluctuation outside the training sequence.

[The Operation of Section 104 for Detecting Dynamic DC Offset in the Longest Overlapping Part Sequences]

(1) The operation of section 300 of a high resolution version will be described.

As shown in FIG. 5, first longest overlapping part sequence extracting section 301 extracts and outputs first longest overlapping part sequence 202 (see FIG. 3) from the received signal, and second longest overlapping part sequence extracting section 302 extracts and outputs second longest overlapping part sequence 203 (see FIG. 3) from the received signal.

Amplitude difference detecting section 303 calculates the differences between the sampling values of the first longest overlapping part received signal outputted from first longest overlapping part sequence extracting section 301 and the sampling values of the second longest overlapping part received signal outputted from second longest overlapping part sequence extracting section 301, and sets the position where the difference exceeds a predetermined threshold as a DC offset fluctuation position. Amplitude difference detecting section 303 then calculates an average value of the differences between the sampling values before the DC offset fluctuation position and an average value of the differences between the sampling values after the DC offset fluctuation position, sets the difference between these average values as the amount of DC offset fluctuation, and outputs the DC offset fluctuation position and the amount of DC offset fluctuation.

According to the method of detecting dynamic DC offset in the longest overlapping part sequences using section 300, it is possible to derive a DC offset fluctuation value and a change position with a relatively small amount of processing.

(2) The operation of section 400 of a low resolution version will be described.

As shown in FIG. 6, first longest overlapping part sequence extracting section 401 extracts and outputs first longest overlapping part sequence 202 (see FIG. 3) from the received signal, and second longest overlapping part sequence extracting section 402 extracts and outputs second longest overlapping part sequence 203 (see FIG. 3) from the received signal.

Amplitude difference average value calculating section 403 calculates an integral of the differences between the sampling values of the first longest overlapping part received signal outputted from first longest overlapping part sequence extracting section 401 and the sampling values of the second longest overlapping part received signal outputted from second longest overlapping part sequence extracting section 402, and, when the difference exceeds a predetermined threshold, outputs the integral of the differences as the amount of DC offset fluctuation.

The method of detecting dynamic DC offset in the longest overlapping part sequences using section 400 does not output change position information, and so can calculate the DC offset fluctuation value with the smaller amount of processing than in section 300 of a high resolution version, so that the method is advantageous when the method performs processing (for example, equalizing processing and decoding processing) with high correction capability after DC offset canceling section 106 (see FIG. 2).

[The Operation of Section 105 for Detecting Dynamic DC offset Outside the Longest Overlapping Part Sequences]

As shown in FIG. 7, section 501 extracts from the received signal and outputs the sampling values of the received signal or part of the received signal which exists in a burst before the first longest overlapping part sequence at a predetermined position, and section 502 extracts from the received signal and outputs the sampling values of the received signal or part of the received signal which exists in a burst after the second longest overlapping part sequence at a predetermined position.

Amplitude difference average value calculating section 503 calculates an integral of the sampling values before the first longest overlapping part sequence received signal outputted from section 501 and an integral of the sampling values after the second longest overlapping part sequence received signal outputted from section 502, and, when the difference between the integrals exceeds a predetermined threshold, outputs the difference between the integrals as the amount of DC offset fluctuation.

According to the method of detecting dynamic DC offset outside the longest overlapping part sequences using section 105, it is possible to derive DC offset fluctuation value and the change position with a relatively small amount of processing.

[The Operation of DC Offset Canceling Section 106]

(1) The operation when DC offset canceling section 106 receives a first amount of DC offset fluctuation and first DC offset fluctuation position outputted from section 300, and a second amount of DC offset fluctuation outputted from section 105, will be described.

As shown in FIG. 8, when the first amount of DC offset fluctuation is detected from the first amount of DC offset fluctuation and first DC offset fluctuation position outputted from section 300 in FIG. 5 and the second amount of DC offset fluctuation outputted from section 105 in FIG. 7, DC offset correction value and correction position calculating section 601 outputs the first amount of DC offset fluctuation and the first DC offset fluctuation position as the amount of DC offset after the change position and the change position, respectively. When the first amount of DC offset fluctuation is not detected, DC offset correction value and correction position calculating section 601 outputs the value obtained by inverting the sign of half of the second amount of DC offset fluctuation as the amount DC offset before the change position, and the half of the second amount of DC offset fluctuation as the amount of DC offset after the change position.

When the change position is set, adaptive DC offset correcting section 602 switches the amount of DC offset from the amount of DC offset before the change position to the amount of DC offset after the change position and subtracts the amount of DC offset from the received signal, and, when the change position is not set, adaptive DC offset correcting section 602 subtracts the amount of DC offset before the change position from the sampling values before the first longest overlapping part sequence and subtracts the amount of DC offset after the change position from the sampling values after the second longest overlapping part sequence.

According to the DC offset canceling method using DC offset canceling section 106 that receives the output of section 300, it is possible to realize a smaller amount of processing.

(2) The operation of DC offset canceling section 106 when section 400 in FIG. 6 is used instead of above-described section 300, will be described.

Although not shown, when the first amount of DC offset fluctuation is detected from the first amount of DC offset fluctuation outputted from section 400 in FIG. 6 and the second amount of DC offset fluctuation outputted from section 105 in FIG. 7, DC offset correction value and correction position calculating section 601 outputs the first amount of DC offset fluctuation as the amount of DC offset after the change position and outputs the intermediate position between first longest overlapping part sequence 202 (see FIG. 3) and second longest overlapping part sequence 203 (see FIG. 3) as the change position. When the first amount of DC offset fluctuation is not detected, DC offset correction value and correction position calculating section 601 outputs the value obtained by inverting the sign of half of the second amount of DC offset fluctuation as the amount of DC offset before the change position, and the half of the second amount of DC offset fluctuation as the amount of DC offset after the change position.

When the change position is set, adaptive DC offset correcting section 602 switches the amount of DC offset from the amount of DC offset before the change position to the amount of DC offset after the change position and subtracts the amount of DC offset from the received signal, and, when the change position is not set, adaptive DC offset correcting section 602 subtracts the amount of DC offset before the change position from the sampling values before the first longest overlapping part sequence and subtracts the amount of DC offset after the change position from the sampling values after the second longest overlapping part sequence.

According to the DC offset canceling method using DC offset canceling section 106 that receives the output of section 400, it is possible to eliminate erroneous detection due to the influence of noise and fading, and realize a smaller amount of processing.

(3) Although above-described DC offset correction value and correction position calculating section 601 outputs the value obtained by inverting the sign of half of the second amount of DC offset fluctuation as the amount of DC offset before the change position, and outputs the half of the second amount of DC offset fluctuation as the amount of DC offset after the change position, the amount of DC offset before the change position and the amount of DC offset after the change position may be extended to the value obtained by multiplying the second amount of DC offset fluctuation by a constant K.

An example will be described where DC offset correction value and correction position calculating section 601 that receives the output of section 300 in FIG. 5 outputs the value obtained by multiplying the second amount of DC offset fluctuation by a constant K as the amount of DC offset after the change position.

Although not shown, when the first amount of DC offset fluctuation is detected from the first amount of DC offset fluctuation and first DC offset fluctuation position outputted from section 300 in FIG. 5 and the second amount of DC offset fluctuation outputted from section 105 in FIG. 7, DC offset correction value and correction position calculating section 601 outputs the first amount of DC offset fluctuation and the first DC offset fluctuation position as the amount of DC offset after the change position and the change position, respectively. When the first amount of DC offset fluctuation is not detected, DC offset correction value and correction position calculating section 601 outputs the value obtained by inverting the sign of the value obtained by multiplying the second amount of DC offset fluctuation by a constant K as the amount of DC offset before the change position, and outputs the value obtained by multiplying the second amount of DC offset fluctuation by a constant K as the amount of DC offset after the change position.

When the change position is set, adaptive DC offset correcting section 602 switches the amount of DC offset from the amount of DC offset before the change position to the amount of DC offset after the change position and subtracts the amount of DC offset from the received signal, and, when the change position is not set, adaptive DC offset correcting section 602 subtracts the amount of DC offset before the change position from the sampling values before the first longest overlapping part sequence and subtracts the amount of DC offset after the change position from the sampling values after the second longest overlapping part sequence.

According to the DC offset canceling method using enhancement type DC offset canceling section 106 that receives the output of section 300, it is possible to realize a smaller amount of processing. Further, by using the value obtained by multiplying the estimated DC offset amount by a constant K as a DC offset correction value, it is possible to adjust the DC offset correction value arbitrarily and select the correction value according to robustness against residual DC offset in the applied reception system.

(4) The operation of enhancement type DC offset canceling section 106 when section 400 in FIG. 6 is used instead of above-described section 300, will be described.

Although not shown, when the first amount of DC offset fluctuation is detected from the first amount of DC offset fluctuation outputted from section 400 in FIG. 6 and the second amount of DC offset fluctuation outputted from section 105 in FIG. 7, DC offset correction value and correction position calculating section 601 outputs the first amount of DC offset fluctuation as the amount of DC offset after the change position and outputs the intermediate position between first longest overlapping part sequence 202 (see FIG. 3) and second longest overlapping part sequence 203 (see FIG. 3) as the change position. When the first amount of DC offset fluctuation is not detected, DC offset correction value and correction position calculating section 601 outputs the value obtained by inverting the sign of the value obtained by multiplying the second amount of DC offset fluctuation by a constant K as the amount of DC offset before the change position and outputs the value obtained by multiplying the second amount of DC offset fluctuation by a constant K as the amount of DC offset after the change position.

When the change position is set, adaptive DC offset correcting section 602 switches the amount of DC offset from the amount of DC offset before the change position to the amount of DC offset after the change position and subtracts the amount of DC offset from the received signal, and, when the change position is not set, adaptive DC offset correcting section 602 subtracts the amount of DC offset before the change position from the sampling values before the first longest overlapping part sequence and subtracts the amount of DC offset after the change position from the sampling values after the second longest overlapping part sequence.

According to the DC offset canceling method using enhancement type DC offset canceling section 106 that receives the output of section 400, it is possible to eliminate erroneous detection due to the influence of noise and fading, and realize a smaller amount of processing. Further, by using the value obtained by multiplying the estimated DC offset amount by a constant K as a DC offset correction value, it is possible to adjust the DC offset correction value arbitrarily and select the correction value according to robustness against residual DC offset in the applied reception system.

As described above, according to the present embodiment, focus is placed on the overlapping part sequences in the training sequence of the received signal, and the present invention includes: section 104 for detecting dynamic DC offset in the longest overlapping part sequences that detects dynamic DC offset in the longest overlapping part sequences from the differences between the sampling values of the first longest overlapping part sequence and the sampling values of the second longest overlapping part sequence, the first longest overlapping part sequence and the second longest overlapping part sequence being overlapping part sequences in the training sequence of the received signal converted to a digital baseband signal; section 105 for detecting dynamic DC offset outside the longest overlapping part sequences that detects dynamic DC offset outside the longest overlapping part sequences from the difference between the average value of the sampling values of the received signal which exists in a burst before the first longest overlapping part sequence, and the average value of the sampling values of the received signal which exists in a burst after the second longest overlapping part sequence; and DC offset canceling section 106 that adaptively subtracts the DC offset value from the received signal based on the detection results. Therefore, it is possible to detect DC offset fluctuation which influences reception characteristics significantly, in the training sequence, with high accuracy using the characteristics of a known signal sequence and detect and cancel DC offset fluctuation outside the training sequence.

For example, with the direct conversion scheme which has started being adopted to reduce the circuit scale of a radio RF section, residual DC offset components increase compared to the heterodyne scheme, and, particularly with the GSM scheme, dynamic DC offset may increase rapidly in the middle of the processing frame, which leads to deterioration of reception characteristics, and dynamic DC offset is difficult to cancel through the conventional average value estimation. The dynamic DC offset canceling apparatus of the present embodiment can detect and correct dynamic DC offset that deteriorates bit error rate characteristics particularly, in the training sequence, with high accuracy, and compensate for dynamic DC offset by only adding a small amount of processing of comparing several samples to the conventional average value processing, so that it is possible to provide a receiver that improves the error rate characteristics.

Embodiment 2

Figure 9:
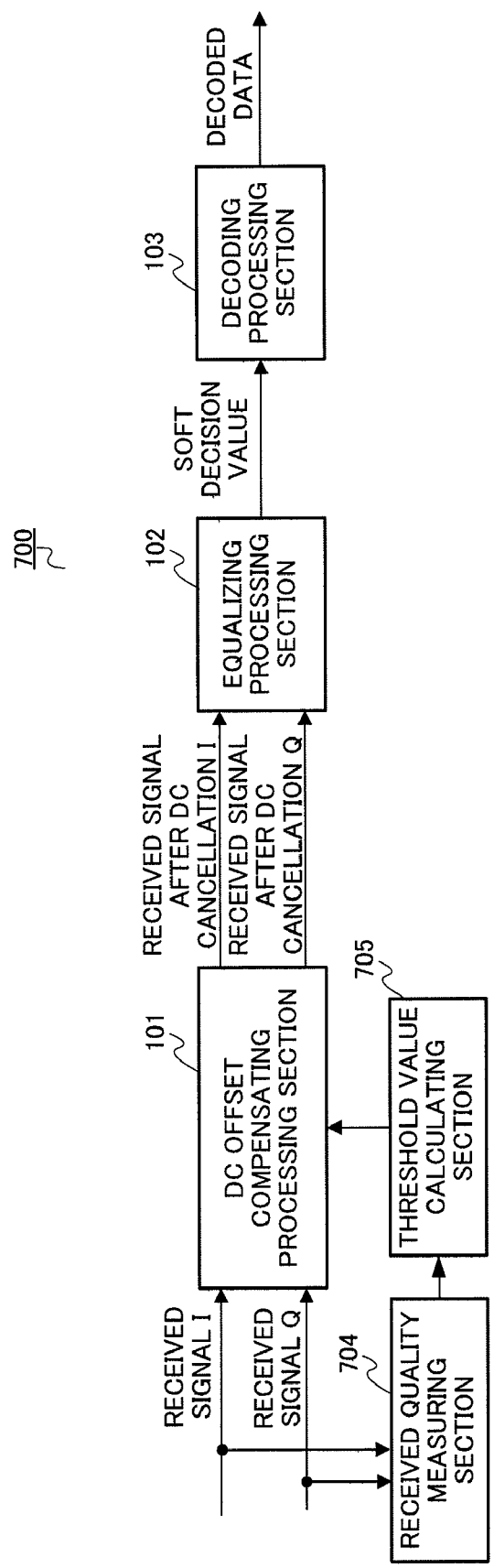
FIG. 9 is a block diagram showing the configuration of a receiver with a dynamic DC offset canceling apparatus according to Embodiment 2 of the present invention.

FIG. 9 is a block diagram showing the configuration of a receiver with the dynamic DC offset canceling apparatus according to Embodiment 2 of the present invention and is an example of applying adaptive threshold fluctuation to dynamic DC offset detection and cancellation. The components that are the same as those in FIG. 1 will be assigned the same reference numerals.

In FIG. 9, receiver 700 with a dynamic DC offset canceling apparatus is configured with: DC offset compensating processing section 101 that receives as input received signals I and Q which are converted to digital baseband signals, and cancels DC offset from the received signals I and Q; equalizing processing section 102 that equalizes the received signals subjected to DC offset compensating processing; decoding processing section 103 that decodes the received signals equalized by equalizing processing section 102; received quality measuring section 704 that receives the signals as input and measures received quality (for example, the SNR (Signal to Noise Ratio), received power level, BER (Bit Error Rate) using the training sequence); and threshold calculating section 705 that receives the received quality as input and changes a threshold which is adaptively used for the received quality at the DC offset compensating processing section.

In this way, the dynamic DC offset canceling system of the present embodiment is configured with: received quality measuring section 704 that receives a signal converted to a digital baseband signal as input and measures received quality of the received signal; threshold calculating section 705 that receives the received quality as input and determines a threshold for DC offset compensating processing; and DC offset compensating processing section 101 that carries out dynamic DC offset compensating processing based on the threshold, so that, by increasing the threshold when the received quality is high and setting the threshold so as to cancel only large DC offset fluctuation, it is possible to reduce erroneous detection and prevent the reception characteristics from deteriorating.

Embodiment 3

Figure 10:
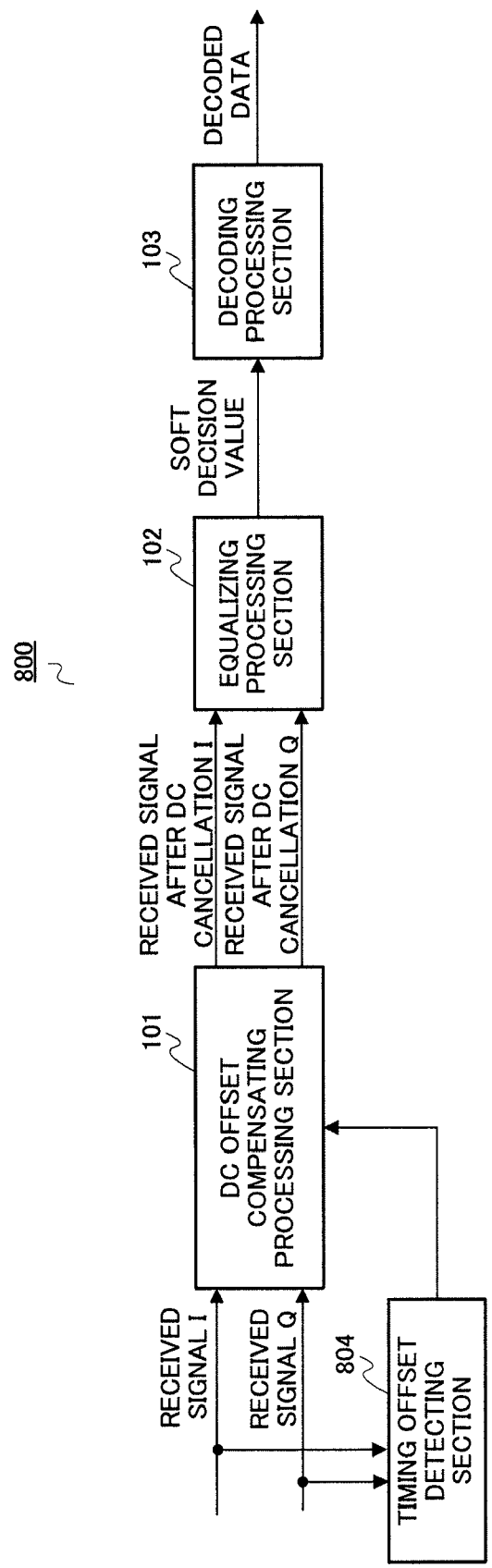
FIG. 10 is a block diagram showing the configuration of a receiver with a dynamic DC offset canceling apparatus according to Embodiment 3 of the present invention.
Figure 11:
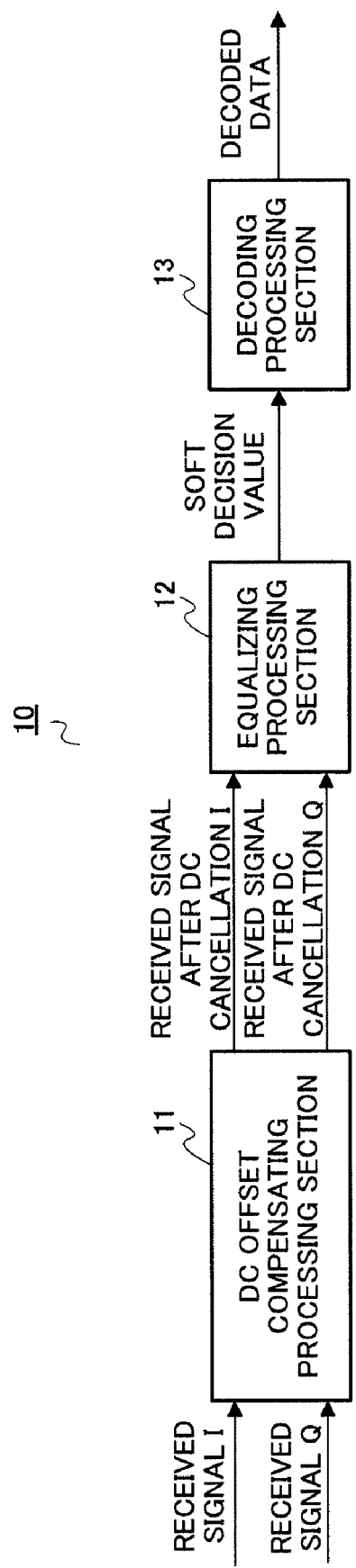
FIG. 11 is a block diagram showing the configuration of a receiver with the conventional DC offset canceling apparatus.
Figure 12:
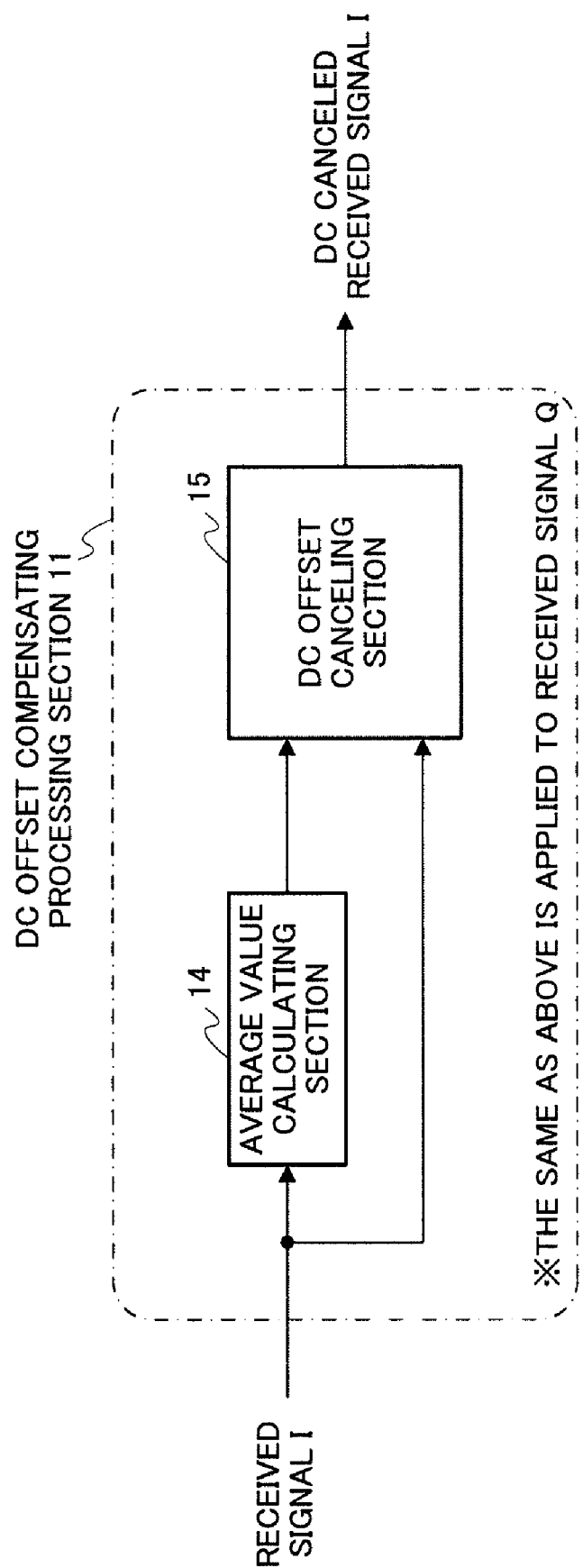
FIG. 12 shows the configuration of a DC offset compensating processing section in the conventional DC offset canceling apparatus.

FIG. 10 is a block diagram showing the configuration of the receiver with the dynamic DC offset canceling apparatus according to Embodiment 3 of the present invention and is an example of applying the present invention to dynamic DC offset detection and cancellation using timing offset information. The components that are the same as those in FIG. 1 will be assigned the same reference numerals.

In FIG. 10, receiver 800 with a dynamic DC offset canceling apparatus is configured with: DC offset compensating processing section 101 that receives as input, received signals I and Q which are converted to digital baseband signals and cancels a DC offset from the received signals I and Q; equalizing processing section 102 that equalizes the received signals subjected to DC offset compensating processing; decoding processing section 103 that decodes the received signals equalized by equalizing processing section 102; and timing offset detecting section 804 that receives the received signals as input and detects a timing offset.

The above-described timing offset detection uses, for example, the correlation result of the training sequences. When there is timing offset, it is possible to prevent erroneous detection due to shift of the position of the first longest overlapping part sequence and the position of the second longest overlapping part sequence.

In this way, the dynamic DC offset canceling system according to the present embodiment is configured with: timing offset detecting section 804 that receives as input, the received signal converted to a digital baseband signal and calculates the timing offset amount of the received signal; and DC offset compensating processing section 101 that receives the timing offset amount as input, corrects the positions of the first longest overlapping part sequence and the second longest overlapping part sequence for dynamic DC offset compensating processing and carries out dynamic DC offset compensating processing, so that, when there is timing offset, it is possible to prevent erroneous detection due to shift of the position of the first longest overlapping part sequence and the position of the second longest overlapping part sequence.

The above description is examples of preferred embodiments of the present invention, but the present invention is not limited to these.

Further, although the terms "dynamic DC offset canceling apparatus" and "dynamic DC offset canceling method" are used in the above embodiments, this is for convenience of explanation, and it is also possible to use other terms such as "DC offset correction circuit" and "DC offset correction method."

Further, the type, the number and the connection method of circuit sections configuring the above-described DC offset canceling apparatus, for example, the first longest overlapping part sequence extracting section and the second longest overlapping part sequence extracting section, and, further, the configuration examples of the amplitude difference detecting section, amplitude difference average value calculating section and received quality measuring section, are not limited to the above-described embodiments.

As described above, according to the present invention, it is possible to detect and correct dynamic DC offset that deteriorates bit error rate characteristics, in the training sequence, with high accuracy, and compensate for dynamic DC offset by only adding to the conventional average value processing, a small amount of processing of comparing several samples, so that it is possible to provide an inexpensive receiver that improves the error rate characteristics.

Therefore, the dynamic DC offset canceling apparatus and the dynamic DC offset canceling method according to the present invention are used as part of the reception processing of a mobile telephone for mobile communication. Particularly with the GSM scheme spread mainly in Europe and the EDGE (Enhanced Data GSM Environment) scheme, which is the third generation version of the GSM scheme, it is possible to realize inexpensive mobile telephones or contribute to extension of a continuous standby time and a continuous talk time. Further, the present invention is suitable for use as a receiver with a radio section of the direct conversion scheme in digital mobile communication.

What is claimed is:

1. A dynamic direct current offset canceling apparatus comprising:
a section for detecting dynamic direct current offset in longest overlapping part sequences, that detects dynamic direct current offset in the longest overlapping part sequences from differences between sampling values of a first longest overlapping part sequence and sampling values of a second longest overlapping part sequence, the first longest overlapping part sequence and the second longest overlapping part sequence comprising overlapping part sequences in a training sequence of the received signal converted to a digital baseband signal;
a section for detecting dynamic direct current offset outside longest overlapping part sequences, that detects dynamic direct current offset outside the longest overlapping part sequences from a difference between an average value of sampling values of the received signal which exists in a burst before the first longest overlapping part sequence, and an average value of sampling values of the received signal which exists in a burst after the second longest overlapping part sequence; and
a direct current offset canceling section that adaptively subtracts a direct current offset value from the received signal based on the detection result outputted from the section for detecting dynamic direct current offset in the longest overlapping part sequences and the detection result outputted from the section for detecting dynamic direct current offset outside the longest overlapping part sequences.

2. The dynamic direct current offset canceling apparatus according to claim 1, wherein the section for detecting dynamic direct current offset in the longest overlapping part sequences comprises:
a first longest overlapping part sequence extracting section that extracts and outputs the first longest overlapping part sequence from the received signal;
a second longest overlapping part sequence extracting section that extracts and outputs the second longest overlapping part sequence from the received signal; and
an amplitude difference detecting section that calculates differences between sampling values of the first longest overlapping part received signal outputted from the first longest overlapping part sequence extracting section and sampling values of the second longest overlapping part received signal outputted from the second longest overlapping part sequence extracting section, sets a position where the difference exceeds a predetermined threshold a direct current offset fluctuation position, calculates an average value of differences between sampling values before the direct current offset fluctuation position and an average value of differences between sampling values after the direct current offset fluctuation position, sets a difference between the average values as the amount of direct current offset fluctuation, and outputs the direct current offset fluctuation position and the amount of direct current offset fluctuation.

3. The dynamic direct current offset canceling apparatus according to claim 1, wherein the section for detecting dynamic direct current offset in the longest overlapping part sequences comprises:
 a first longest overlapping part sequence extracting section that extracts and outputs the first longest overlapping part sequence from the received signal;
 a second longest overlapping part sequence extracting section that extracts and outputs the second longest overlapping part sequence from the received signal; and
 an amplitude difference average value calculating section that calculates an integral of differences between sampling values of the first longest overlapping part received signal outputted from the first longest overlapping part sequence extracting section and sampling values of the second longest overlapping part received signal outputted from the second longest overlapping part sequence extracting section, and, when the difference exceeds a predetermined threshold, outputs the integral of the differences as the amount of direct current offset fluctuation.

4. The dynamic direct current offset canceling apparatus according to claim 1, wherein the section for detecting dynamic direct current offset outside the longest overlapping part sequences comprises:
 a section for extracting a sequence before the first longest overlapping part sequence, that extracts from the received signal and outputs sampling values of a received signal or part of the received signal which exists in a burst before the first longest overlapping part sequence at a predetermined position;
 a section for extracting a sequence after the second longest overlapping part sequence, that extracts from the received signal and outputs sampling values of a received signal or part of the received signal which exists in a burst after the second longest overlapping part sequence at a predetermined position; and
 an amplitude difference average value calculating section that calculates an integral of sampling values before the first longest overlapping part received signal outputted from the section for extracting a sequence before the first longest overlapping part sequence, and an integral of sampling values after the second longest overlapping part received signal outputted from the second longest overlapping part sequence extracting section, and, when the difference between the integrals exceeds a predetermined threshold, outputs the difference between the integrals as the amount of direct current offset fluctuation.

5. The dynamic direct current offset canceling apparatus according to claim 2, wherein the direct current offset canceling section comprises:
 a direct current offset correction value and correction position calculating section that, when a first amount of direct current offset fluctuation is detected from the first amount of direct current offset fluctuation and a first direct current offset fluctuation position outputted from the section for detecting dynamic direct current offset in the longest overlapping part sequences, and a second amount of direct current offset fluctuation outputted from the section for detecting dynamic direct current offset outside the longest overlapping part sequences, outputs the first amount of direct current offset fluctuation and the first direct current offset fluctuation position as an amount of direct current offset after a change position and the change position, respectively, and, when the first amount of direct current offset fluctuation is not detected, outputs a value obtained by inverting a sign of half of the second amount of direct current offset fluctuation as an amount of direct current offset before the change position, and the half of the second amount of direct current offset fluctuation as an amount of direct current offset after the change position; and
 an adaptive direct current offset correcting section that, when the change position is set, switches an amount of direct current offset from the amount of direct current offset before the change position to the amount of direct current offset after the change position and subtracts the amount of direct current offset from the received signal, and, when the change position is not set, subtracts the amount of direct current offset before the change position from the sampling values after the second longest overlapping part sequence.

6. The dynamic direct current offset canceling apparatus according to claim 3, wherein the direct current offset canceling section comprises:
 a direct current offset correction value and correction position calculating section that, when a first amount of direct current offset fluctuation is detected from a first amount of direct current offset fluctuation outputted from the section for detecting dynamic direct current offset in the longest overlapping part sequences and a second amount of direct current offset fluctuation outputted from the section for detecting dynamic direct current offset outside the longest overlapping part sequences, outputs the first amount of direct current offset fluctuation as an amount of direct current offset after a change position, and an intermediate position between the first longest overlapping part sequence and the second longest overlapping part sequence as the change position, and, when the first amount of direct current offset fluctuation is not detected, outputs a value obtained by inverting a sign of half of the second amount of direct current offset fluctuation as the amount of direct current offset before the change position and the half of the second amount of direct current offset fluctuation as the amount of direct current offset after the change position; and
 an adaptive direct current offset correcting section that, when the change position is set, switches an amount of direct current offset from the amount of direct current offset before the change position to the amount of direct current offset after the change position and subtracts the amount of direct current offset from the received signal, and, when the change position is not set, subtracts the amount of direct current offset before the change position from the sampling values before the first longest overlapping part sequence, and subtracts the amount of direct current offset after the change position from the sampling values after the second longest overlapping part sequence.

7. The dynamic direct current offset canceling apparatus according to claim 2, wherein the direct current offset canceling section comprises:
 a direct current correction value and correction position calculating section that, when a first amount of direct current offset fluctuation is detected from the first amount of direct current offset fluctuation and a first direct current offset fluctuation position outputted from the section for detecting dynamic direct current offset in the longest overlapping part sequences and a second amount of direct current offset fluctuation outputted from the section for detecting dynamic direct current offset outside the longest overlapping part sequences, outputs the first amount of direct current offset fluctuation and the first direct current offset fluctuation position as an amount of direct current offset after a change position and the change position, respectively, and, when the first amount of direct current offset fluctuation is not detected, outputs a value obtained by inverting a sign of a value obtained by multiplying the second amount of direct current offset fluctuation by a constant K as an amount of direct current offset before the change position and the value obtained by multiplying the second amount of direct current offset fluctuation by the constant K as an amount of direct current offset after the change position; and an adaptive direct current offset correcting section that, when the change position is set, switches an amount of direct current offset from the amount of direct current offset before the change position to the amount of direct current offset after the change position and subtracts the amount of direct current offset from the received signal, and, when the change position is not set, subtracts the amount of direct current offset before the change position from sampling values before the first longest overlapping part sequence, and subtracts the amount of direct current offset after the change position from sampling values after the second longest overlapping part sequence.

8. The dynamic direct current offset canceling apparatus according to claim 3, wherein the direct current offset canceling section comprises:

a direct current offset correction value and correction position calculating section that, when a first amount of direct current offset fluctuation is detected from the first amount of direct current offset fluctuation outputted from the section for detecting dynamic direct current offset in the longest overlapping part sequences and a second amount of direct current offset fluctuation outputted from the section for detecting dynamic direct current offset outside the longest overlapping part sequences, outputs the first amount of direct current offset fluctuation as an amount of direct current offset after a change position and an intermediate position of the first longest overlapping part sequence and the second longest overlapping part sequence as the change position, and, when the first amount of direct current offset fluctuation is not detected, outputs a value obtained by inverting a sign of a value obtained by multiplying the second amount of direct current offset fluctuation by a constant K as an amount of direct current offset before the change position and the value obtained by multiplying the second amount of direct current offset fluctuation by the constant K as an amount of direct current offset after the change position; and an adaptive direct current offset correcting section that, when the change position is set, switches an amount of direct current offset from the amount of direct current offset before the change position to the amount of direct current offset after the change position and subtracts the amount of direct current offset from the received signal, and, when the change position is not set, subtracts the amount of direct current offset before the change position from sampling values before the first longest overlapping part sequence and subtracts the amount of direct current offset after the change position from sampling values after the second longest overlapping part sequence.

9. The dynamic direct current offset canceling apparatus according to claim 1, further comprising:

a received quality measuring section that measures received quality of the received signal converted to the digital baseband signal;

a threshold calculating section that receives the received quality as input and determines a threshold for direct current offset compensating processing; and a dynamic direct current offset canceling section that carries out dynamic direct current offset compensating processing based on the threshold.

10. The dynamic direct current offset canceling apparatus according to claim 1, further comprising:

a timing offset detecting section that calculates an amount of timing offset with the received signal converted to the digital baseband signal; and a dynamic direct current offset canceling section that receives the amount of timing offset as input, corrects positions of the first longest overlapping part sequence and the second longest overlapping part sequence for dynamic direct current offset compensating processing and carries out the dynamic direct current offset compensating processing.

11. A dynamic direct current offset canceling method comprising the steps of:

detecting dynamic direct current offset in longest overlapping part sequences from differences between sampling values of a first longest overlapping part sequence and sampling values of a second longest overlapping part sequence, the first longest overlapping part sequence and the second longest overlapping part sequence comprising overlapping part sequences in a training sequence of a received signal converted to a digital baseband signal;

detecting dynamic direct current offset outside the longest overlapping part sequences from a difference between an average value of sampling values of a received signal which exists in a burst before the first longest overlapping part sequence, and an average value of sampling values of a received signal which exists in a burst after the second longest overlapping part sequence; and adaptively subtracting a direct current offset value from the received signal based on the detection result of the dynamic direct current offset in the longest overlapping part sequences and the detection result of the dynamic direct current offset outside the longest overlapping part sequences.

\* \* \* \* \*